(No Model.)
G. W. N. YOST & W. H. BRACY.
TYPE WRITING MACHINE.
No. 304,770. Patented Sept. 9, 1884.
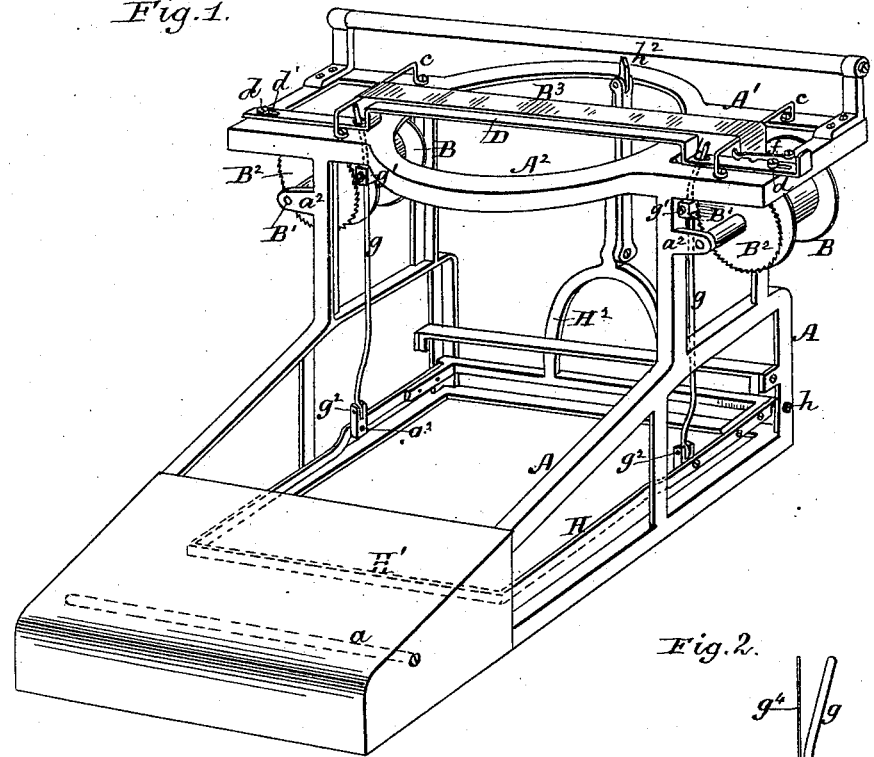
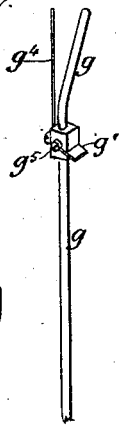
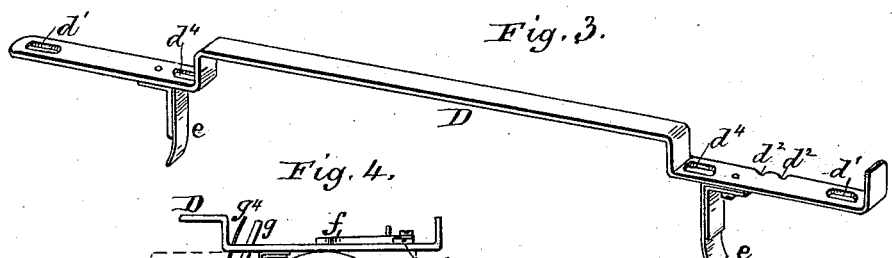
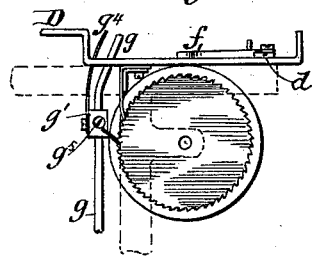
Witnesses
L. C. Hills
W. B. Masson
Inventors
George W. N. Yost
and William H. Bracy
by E. E. Masson
atty

United States Patent Office.

GEORGE W. N. YOST AND WILLIAM H. BRACY, OF NEW YORK, N. Y., ASSIGNORS TO THE AMERICAN WRITING MACHINE COMPANY.

TYPE-WRITING MACHINE.

SPECIFICATION forming part of Letters Patent No. 304,770, dated September 9, 1884.

Application filed February 29, 1884. (No model.)

*To all whom it may concern:*

Be it known that we, GEORGE W. N. YOST and WILLIAM H. BRACY, citizens of the United States, residing at New York city, in the county of New York and State of New York, have invented certain new and useful Improvements in Type-Writers, of which the following is a specification, reference being had therein to the accompanying drawings, in which—

Figure 1 is a perspective view of a portion of a type-writing machine having our improvement attached thereto. Fig. 2 is a perspective view of one of the feed-pawls, with its actuating rod and spring. Fig. 3 is a perspective view of the retaining-pawls and connecting-bar thereof. Fig. 4 is a front view of one of the spool ratchet-wheels, its operating-pawl, and retaining-pawl, with a portion of the frame of the machine in dotted lines.

Our invention relates to improvements in type-writing machines in which the inking-ribbon is wound on spools provided with ratchet-wheels, and the latter are actuated by means of pawls; and the object of our improvements is to provide each pawl-rod with means peculiarly arranged, as hereinafter described, and specifically set forth in the claims, to control and guide said pawl-rod toward or from the spool ratchet-wheel and operate it in connection with the letter space-frame. We attain this object by the mechanism illustrated in the accompanying drawings.

Similar letters refer to similar parts throughout the several views.

The frame of the machine is represented at A, and is of the usual form given to machines, having the key-levers pivoted at the fore end upon a transverse rod, $a$. This frame carries the upper platform, A', having its central portion, A², circular, as a foundation for the journal-bearings of the type-levers. (Not shown.) Each ribbon-spool B is secured by friction upon a journal, B', mounted in bearings $a^2$, projecting from the ends of the frame; and upon each journal B' is secured a ratchet-wheel, B², through which motion is transmitted to the ribbon-spools, the inking-ribbon B³ passing from one spool to the other over transverse wires $c$, secured upon the top of the upper platform, A', adjoining each end thereof.

Upon said upper platform is also secured a flat bar, D, by means of screws $d$, passing through longitudinal slots $d'$ at each end thereof in such a manner that the bar D can be moved a short distance lengthwise to cause one or the other of the retaining-pawls $e$, secured to the under side thereof, to engage with its ratchet-wheel B². After the bar D has been pushed lengthwise and set with one of its retaining-pawls in engagement with one of the ratchet-wheels, it is retained in said position by means of a flat spring, $f$, secured to the upper platform, A', with its free extremity bearing against the side of the bar D into one of the two notches, $d^2$, formed upon said side of the bar D. The central portion of said bar is bent upward to pass over the journal-bearings of the type-levers without coming in contact or interfering with them. The bar D is slotted longitudinally at $d^4$ close to the point of attachment of the retaining-pawls $e$ at each end, for the passage of the upper end of the pawl-rod $g$, and upon said rod is adjustably secured the pawl $g'$, through which motion is transmitted to the ratchet-wheel B². The lower end of the rod $g$ is pivoted at $g^2$ to a forked link, $g^3$, having its lower end secured to one of the side pieces of the letter-space frame H. The front bar, H', of this frame passes, as usual, under all the key-levers, and is depressed thereby every time a finger-key is pressed upon. The rear portion of the letter-space frame is pivoted at $h$ to the frame A, and carries the arm H², at the upper end of which is pivoted the dog $h^2$, made to engage with the double rack generally found attached to the platen-carriage of this class of machines. The ribbon-spool-operating pawl $g'$ is easily adjusted in proper position relatively to the ratchet-wheel by means of the screw $g^5$, and has secured to the inner side thereof a straight wire spring, $g^4$, that is made to pass with the upper end of the pawl-rod $g$, through the slot $d^4$, to force the pawl $g'$ against and into engagement with the teeth upon the ratchet-wheel B². By pushing endwise the rod D (slotted and notched, as above described) either one of the pawls is released from engagement with one of the ratchet-wheels, while the other is forced into engagement with the opposite ratchet-wheel, and the spring $g^4$ transmits a uniform pressure against the side of the engaged pawl.

Having now fully described our invention, we claim—

1. In combination with the inking-ribbon, spool-ratchet, and the upper platform of a type-writer, and spring $f$, secured to said platform, the bar D, extending thereacross, and provided with slots $d'$ and retaining-pawls $e$, substantially as and for the purpose described.

2. The combination of the letter-space frame of a type-writer, pawl-rod $g$, adjustable pawl $g'$, and spring secured to said pawl, with a ribbon-spool ratchet-wheel, and bar D, provided with slot $d^4$, for the reception of the upper end of the pawl-rod and pawl-spring, substantially as set forth.

In testimony whereof we affix our signatures in presence of two witnesses.

GEORGE W. N. YOST.
    WILLIAM H. BRACY.

Witnesses:
 E. E. MASSON,
 L. C. HILLS.